(12) United States Patent
Brown

(10) Patent No.: US 11,105,306 B2
(45) Date of Patent: Aug. 31, 2021

(54) PUMP HAVING PILOT-ACTUATED ADMISSION VALVE

(71) Applicant: Caterpillar Inc., Deerfield, IL (US)

(72) Inventor: Aaron Michael Brown, Tuscon, AZ (US)

(73) Assignee: Caterpillar Inc., Peoria, IL (US)

( * ) Notice: Subject to any disclaimer, the term of this patent is extended or adjusted under 35 U.S.C. 154(b) by 440 days.

(21) Appl. No.: 15/945,818

(22) Filed: Apr. 5, 2018

(65) Prior Publication Data
US 2019/0309713 A1 Oct. 10, 2019

(51) Int. Cl.
| F02M 59/10 | (2006.01) |
| F02M 59/46 | (2006.01) |
| F16K 41/02 | (2006.01) |
| F04B 49/24 | (2006.01) |

(52) U.S. Cl.
CPC ........ *F02M 59/102* (2013.01); *F02M 59/466* (2013.01); *F04B 49/24* (2013.01); *F16K 41/02* (2013.01)

(58) Field of Classification Search
CPC ........ F04B 49/03; F04B 49/035; F04B 49/24; F04B 49/243; F04B 49/22; F02M 59/36; F02M 59/365; F02M 59/102; F02M 63/0092; F02M 63/0035; F02M 63/0015; F16K 41/02; F16K 31/1221; F16K 31/124; F16K 41/18
See application file for complete search history.

(56) References Cited

U.S. PATENT DOCUMENTS

| 4,317,573 A * | 3/1982 | Karkkainen ............ F16K 41/18 251/214 |
| 4,861,239 A * | 8/1989 | Simmons ................ F04B 9/105 417/383 |
| 6,283,441 B1 | 9/2001 | Tian |
| 6,439,199 B2 | 8/2002 | Ramseyer et al. |
| 2015/0300349 A1 * | 10/2015 | Esders ................... F04B 49/03 417/53 |
| 2016/0186741 A1 | 6/2016 | Sakamoto et al. |

\* cited by examiner

*Primary Examiner* — Philip E Stimpert
(74) *Attorney, Agent, or Firm* — Brannon Sowers & Cracraft

(57) ABSTRACT

A pump includes a pump body having an admission valve movable therein to alternately block and unblock a valve seat to connect a low pressure space to a pumping chamber. A control valve is positioned fluidly between a control chamber and the low pressure space, and moves between a closed position where the control chamber receives high pressure for hydraulically actuating the admission valve, and an open position where the control chamber is connected to the low pressure space to enable closing of the admission valve. The pilot actuation of the admission valve produces a greater travel distance and efficiency than what might be available with certain other actuating mechanisms.

13 Claims, 4 Drawing Sheets

PUMP HAVING PILOT-ACTUATED ADMISSION VALVE

TECHNICAL FIELD

The present disclosure relates generally to a strategy for admitting working fluid into a pumping chamber of a pump, and more particularly to pilot controlled hydraulic actuation of a pump admission valve.

BACKGROUND

The fuel system in many internal combustion engines can be the most sophisticated and complex part of the engine. Rapid motion of components, high fluid pressures, high temperatures, various vibration phenomena, and repetitive impacts create a harsh environment. Fuel pumps in particular can pressurize fuel to several hundred megaPascals (MPa) and can be expected to operate for many hours uninterrupted. In many modern engine operating strategies, a variety of different types and combinations of fuel injections at varying times, amounts, and other properties such as injection rate are accommodated, in part, by a variable discharge pump. The pump is typically in fluid communication with a common rail that feeds multiple fuel injectors, or structured as a so-called unit pump that is associated with one or a small number of fuel injectors.

High pressure fuel pumps are often driven by way of an engine cam, and can include multiple plungers each disposed within an individual pumping chamber. Each of the one or more plungers is reciprocated in response to rotation of the cam and by way of a return spring. In one class of such pumps, the desired variable discharge is enabled by way of outlet metering, where the pump operates more or less consistently and some of the fuel pressurized by the pump is spilled to either the supply line that feeds fuel to the pump and/or returned to the fuel tank. Other fuel pumps are inlet metered, with the position of an inlet valve, or potentially a pattern or timing of opening and closing of the inlet valve, enabling pump discharge to be modulated. Each style of pump has various advantages and disadvantages. In the case of inlet metered pumps, restricting inflow of fuel can be associated with cavitation at certain locations within the fuel pump. Outlet metered pumps are less susceptible to cavitation but tend to dump some of the pressure produced by operation and therefore can be limited in efficiency.

Another feature of outlet metered pumps that can be relevant to fuel system design and overall engine operation relates to obtaining a sufficiently high inflow rate that is nevertheless controllable. Various strategies for designing and controlling valves that regulate the flow in and out of the pumping chamber of an outlet metered pump have been proposed over the years. Such valves generally need to have a high enough flow area to provide sufficient flow to enter the pumping chamber fast enough without cavitating. In the context of rapidly moving pump components, operating and controlling such valves for optimal pump efficiency and performance has proven challenging. One example cam-driven, outlet metered pump is known from United States Patent Application Publication No. 2006/0120880 to Shafer et al. In the Shafer design a common spill passageway is fluidly connectible to first and second pumping chambers, and a control valve in fluid communication with the spill passageway is provided. The control valve selectively spills fluid from the first and second pumping chambers to a low pressure gallery and thereby changes the effective displacement of multiple plungers.

SUMMARY OF THE INVENTION

In one aspect, a pump includes a pump body defining a pumping chamber, a low pressure space, a high pressure space, a valve seat positioned fluidly between the pumping chamber and the low pressure space, and a control chamber in fluid communication with the high pressure space. The pump further includes a pumping element coupled with the pump body and movable within the pumping chamber, and an admission valve blocking the valve seat. The admission valve has a closing hydraulic surface exposed to a fluid pressure of the pumping chamber, and an opening hydraulic surface exposed to a fluid pressure of the control chamber. The pump further includes a control valve assembly having an electrical actuator, and a control valve positioned fluidly between the control chamber and the low pressure space. The control valve is in a closed position, such that the control chamber is blocked from the low pressure space to provide a high pressure on the opening hydraulic surface of the admission valve, and is movable by way of the electrical actuator to an open position where the control chamber is fluidly connected to the low pressure space.

In another aspect, an electronically actuated pump valve assembly includes a pump body defining a pumping chamber structured to receive a movable pumping element, a low pressure space, a high pressure space, a valve seat positioned fluidly between the pumping chamber and the low pressure space, and a control chamber in fluid communication with the high pressure space. The pump valve assembly further includes an admission valve movable between a first position blocking the valve seat, and a second position where the valve seat is open. The admission valve has a closing hydraulic surface exposed to a fluid pressure of the pumping chamber, and an opening hydraulic surface exposed to a fluid pressure of the control chamber. The pump valve assembly further includes a control valve assembly having an electrical actuator, and a control valve positioned fluidly between the control chamber and the low pressure space. The control valve is movable by way of the electrical actuator between a closed position where the control valve blocks the control chamber from the low pressure space, and an open position where the control chamber is fluidly connected to the low pressure space.

In still another aspect, a method of pressurizing a fluid includes applying a fluid pressure of a control chamber fluidly connected with a high pressure space to an opening hydraulic surface of an admission valve, and moving the admission valve in response to the application of a fluid pressure from a first position blocking a valve seat to a second position where the valve seat connects a pumping chamber with a low pressure space. The method further includes admitting a fluid from the low pressure space into a pumping chamber by way of the valve seat during an intake stroke of a pumping element, opening a control valve to fluidly connect the control chamber with the low pressure space such that the fluid pressure of the control chamber is reduced, and moving the admission valve back to the first position in response to the reduction of the fluid pressure of the control chamber. The method still further includes pressurizing the fluid admitted into the pumping chamber by way of the pumping element in a pressurization stroke.

DETAILED DESCRIPTION

Figure 1:
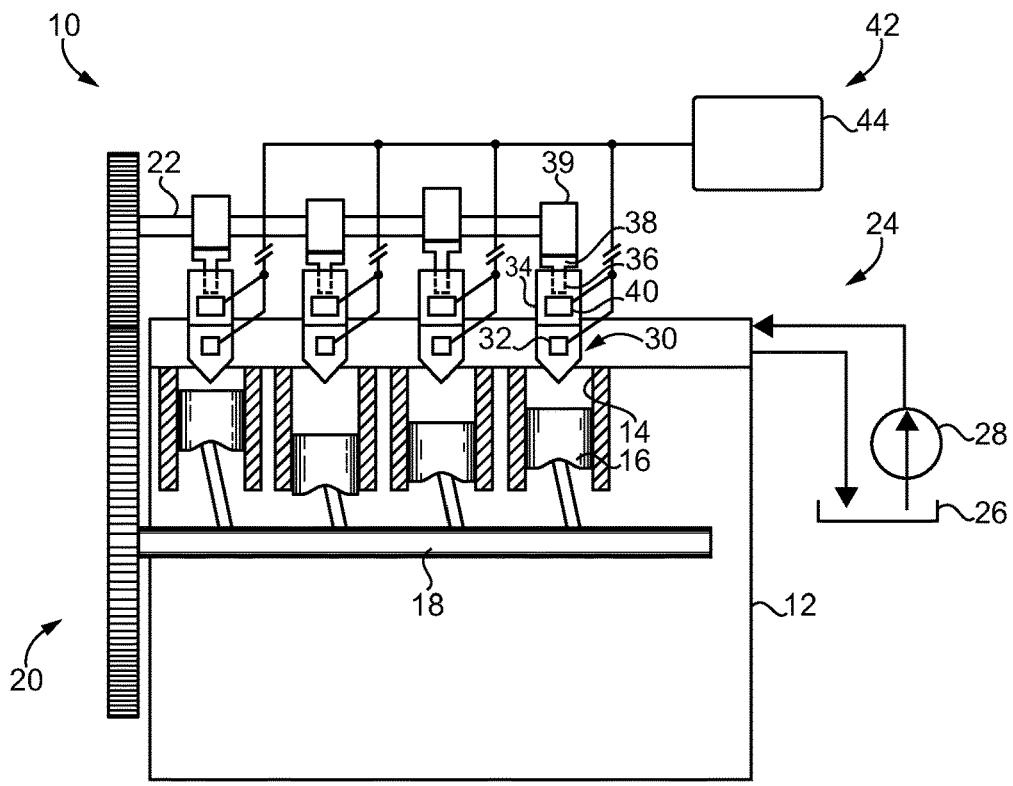
FIG. 1 is a partially sectioned side diagrammatic view of an internal combustion engine system, according to one embodiment.

Referring to FIG. 1, there is shown an internal combustion engine system 10 according to one embodiment. Internal combustion engine system 10 (hereinafter "engine system 10") may include a compression ignition diesel engine that is direct injected, however, the present disclosure is not thereby limited and other engine types and injection strategies are contemplated within the scope of the present disclosure. Engine system 10 includes an engine housing 12 having a plurality of cylinders 14 formed therein, with cylinders 14 being arranged in a V-configuration, an in-line configuration, or in any other suitable arrangement. A plurality of pistons 16 are positioned one within each of the plurality of cylinders 14 and movable between a top-dead center position and a bottom-dead center position in a conventional manner to rotate a crankshaft 18. A geartrain 20 is coupled with crankshaft 18, and structured to transmit rotation of crankshaft 18 to a camshaft 22. Engine system 10 further includes a fuel system 24 having a fuel tank 26 and a fuel pump 28 structured to transfer a fuel, such as a diesel distillate fuel, from fuel tank 26 to engine housing 12 for delivery to a plurality of fuel injectors 30. Each fuel injector 30 may be positioned at least partially within a corresponding one of cylinders 14, and includes an injection valve assembly 32 to inject fuel at an appropriate injection timing and according to a variety of other injection characteristics that will be familiar to those skilled in the art.

Each fuel injector 30 can further include or be coupled with a unit pump 34 having a pumping element 36. For purposes of an understanding of the present disclosure, certain fuel injectors can also be understood as a type of pump. In the illustrated embodiment, camshaft 22 includes a plurality of cams 39 that rotate in contact with a tappet 38 of each unit pump 34. Each unit pump 34 can further include a pump valve assembly 40. Fuel pump 28 can include a low pressure or fuel transfer pump that transitions fuel to engine housing 12 for delivery to each individual fuel injector 30, for pressurization to an injection pressure within the corresponding unit pump 34. As will be further apparent from the following description, each pump valve assembly 40 is operable to regulate flow into a pumping chamber 48 of the corresponding unit pump 34. Engine system 10 also includes a control system 42 having an electronic control unit 44. Electronic control unit 44 is in control communication with each injection valve assembly 32 and each pump valve assembly 40, all of which may be electrically actuated.

Figure 2:
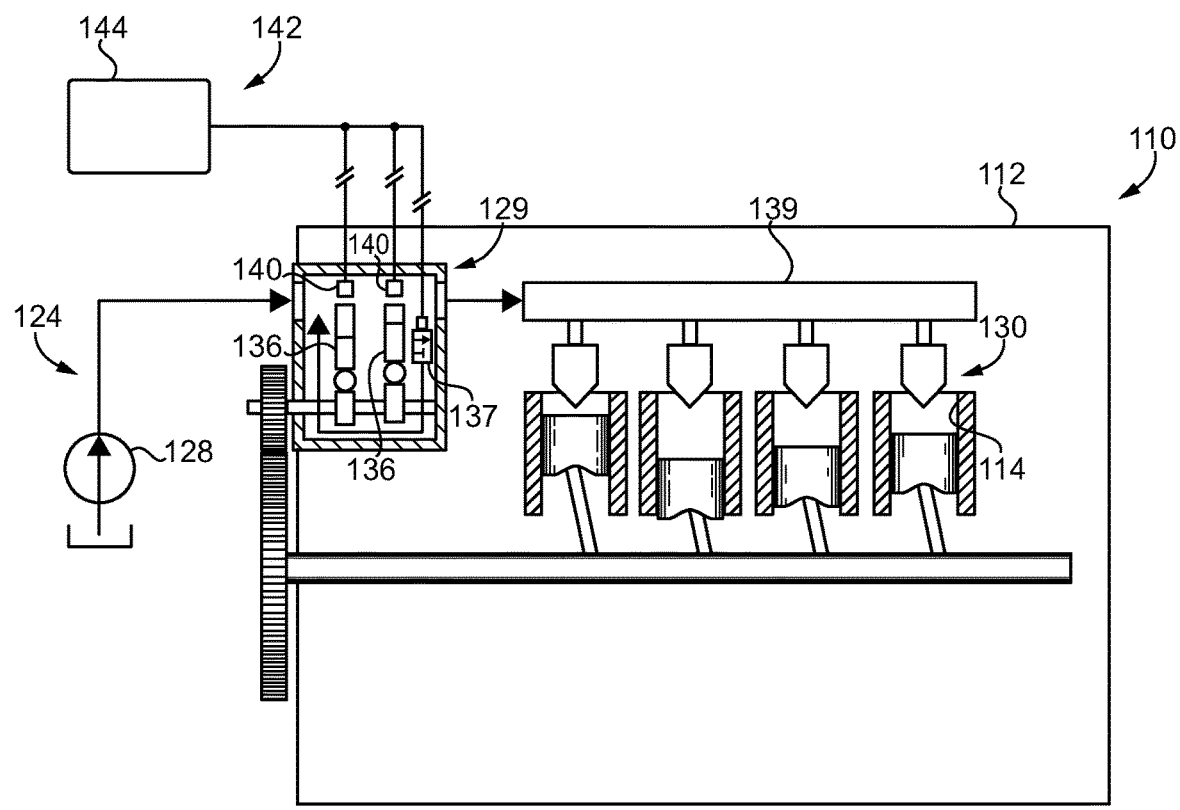
FIG. 2 is a partially sectioned side diagrammatic view of an internal combustion engine system, according to another embodiment.

Referring now to FIG. 2, there is shown another internal combustion engine system 110 according to another embodiment. Internal combustion engine 110 includes an engine housing 112 having a plurality of cylinders 114 formed therein and each associated with a fuel injector 130. A fuel system is shown at 124 and includes a low pressure or fuel transfer pump 128, and a high pressure pump 129. In contrast to the embodiment of FIG. 1, in internal combustion engine system 110 fuel injectors 130 are supplied with fuel at an injection pressure from a common rail 139. Pump 129 operates to increase a pressure of fuel supplied by pump 128 to an injection pressure that is maintained within the common reservoir or common rail 139. Pump 129 can include a plurality of pumping elements 136 that are cam-driven, and each supplied with fuel by way of a pump valve assembly 140. Each pump valve assembly 140 may be configured identically or similarly to pump valve assemblies 40 of FIG. 1, and further discussed herein. A control system 142 having an electronic control unit 144 is in control communication with pump valve assemblies 140. Pump 129 can be outlet metered, with an outlet metering valve 137 structured to spill pressurized fuel back to an intake conduit or inlet of pump 129, for supplying to pumping elements 136. Alternatively or additionally, outlet metering valve 137 can be structured to convey the fuel back to a fuel tank in fuel system 124. It should be appreciated that unit pumps paired with injectors as in FIG. 1 or a multi-plunger outlet metered pump as in FIG. 2 are but two embodiments contemplated within the scope of the present disclosure and various additions, substitutions, modifications, and extensions can be made to the embodiments specifically disclosed herein. As will be further apparent from the following description, the unique design and operation of pump valve assembly 40, the description of which refers by analogy to pump valve assembly 140 and other pump valve assemblies contemplated herein, provides a robust strategy for supply of a working fluid to a pumping chamber in a pump, particularly where a relatively large travel distance of an admission valve is desired.

Figure 3:
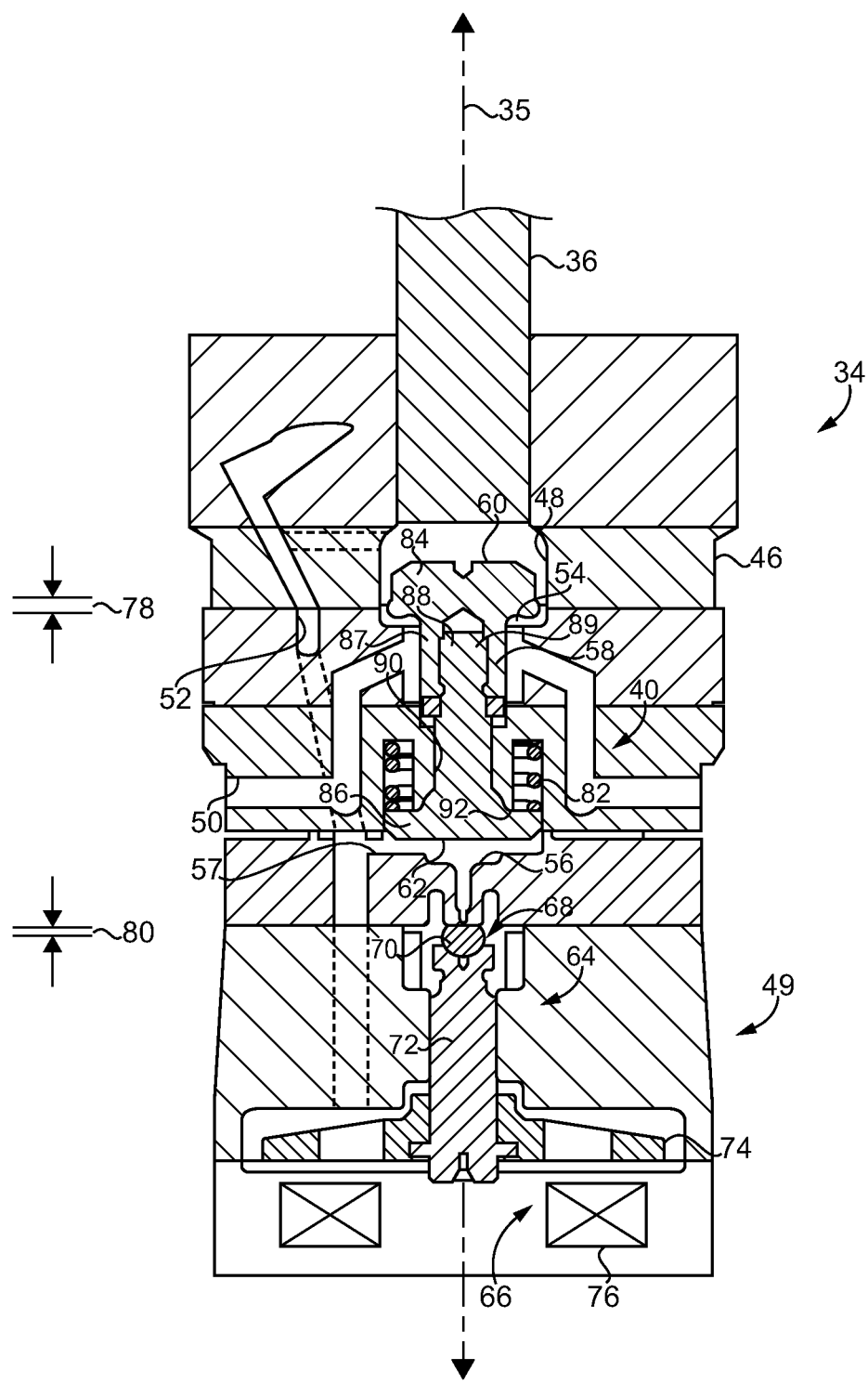
FIG. 3 is a partially sectioned side diagrammatic view of a pump valve assembly in a pump, according to one embodiment.

Turning now to FIG. 3, there is shown a pump 34 in further detail. Pump 34 could be a unit pump that is coupled with, or part of, a fuel injector as in the FIG. 1 illustration. The present description can nevertheless be understood to refer to any of the embodiments contemplated herein, in whole or in part, except where otherwise indicated or apparent from the context. The use or non-use of certain reference numerals in connection with features and functions of the various embodiments is thus for purposes of clarity and convenience, and no limitation or exclusion is thereby intended. Pump 34 includes a pump body 46 having a center axis 35, and defining a pumping chamber 48, a low pressure space 50, a high pressure space 52, and a valve seat 54. Low pressure space 50 can be understood to be or to include fluid passages within pump body 46, and can also be understood to be or to include an exterior space defined by pump body 46 itself. High pressure space 52 can include one or more passages within, or in fluid communication with one or more passages within, pump body 46. Valve seat 54 is positioned fluidly between pumping chamber 48 and low pressure space 50. Pump body 46 further defines a control chamber 56 in fluid communication with high pressure space 52. In an implementation, pump body 46 as depicted in FIG. 3 can include a valve stack 49 formed by a plurality of coaxially arranged valve stack pieces. High pressure space 52 can extend longitudinally through valve stack 49 and thus through the individual coaxially arranged pieces. A passage 57 formed within one of the valve stack pieces, or potentially between two of the valve stack pieces, fluidly connects high pressure space 52 with control chamber 56. A pumping element 36, such as a reciprocating plunger, actuated, for example, by way of a cam as in the embodiments of FIG. 1 and FIG. 2, is coupled with and movable within pump body 46 so as to move within pumping chamber 48 to transition a fluid such as fuel between low pressure space 50 and high pressure space 52 whilst increasing a pressure of the transitioned fluid.

An admission valve 58 is movable within pump body 46 to alternately open or block valve seat 54. Admission valve 58 includes a closing hydraulic surface 60 exposed to a fluid pressure of pumping chamber 48, and an opening hydraulic surface 62 exposed to a fluid pressure of control chamber 56. As further discussed herein, by varying a pressure in control chamber 56, fluid pressure can act upon the opening hydraulic surface 62 to move admission valve 58 from a first or closed position to a second or open position. In FIG. 3, admission valve 58 is shown as it might appear at its open position, although in a rest state of pump 34 admission valve 58 may be in its closed position.

Pump 34 further includes a control valve assembly 64 having an electrical actuator 66 with an armature 74 and a solenoid 76, and a control valve 68 positioned fluidly between control chamber 56 and low pressure space 50. Control valve assembly 64 may be positionable in a closed position, approximately as shown, where control chamber 56 is blocked from low pressure space 50 to provide a high pressure on opening hydraulic surface 62 of admission valve 58 by way of passage 57. Control valve 68 is movable by way of electrical actuator 66 to an open position where control chamber 56 is fluidly connected to low pressure space 50. Control valve 68 can include a free-floating valve member 70 and a rod 72 extending between free-floating valve member 70 and armature 74 of electrical actuator 66. Alternatively a spool or poppet might be used. It will be understood that changing an electrical energy state of solenoid 76, such as energizing solenoid 76, can cause armature 74 to move toward solenoid 76, and lift rod 72 away from valve member 70 such that control chamber 56 is opened to low pressure space 50. The physical connection between control chamber 56 and low pressure space 50 that is established in this manner can extend between valve stack pieces in a generally known manner.

Admission valve 58 can include a nail valve. A nail valve has a shaft or shank and a head, and controls closing and opening of a valve seat by contacting the valve seat with an underside of the head of the "nail." The shaft or shank extends through the valve seat. Typically, one, two, three, or more generally radial passages connect or feed a first side of the subject valve seat, approximately as show in FIG. 3. The underside (not numbered) of the head of the nail can be flat or contoured and extends circumferentially around the shaft/shank. In an implementation, the nail valve can be a double-headed nail valve having a first nail head 84 that blocks valve seat 54 and has closing hydraulic surface 60 located thereon. Admission valve 58 can further include a second nail head 86 having opening hydraulic surface 62 located therein. Admission valve 58 may also include a valve shaft 88 extending between first nail head 84 and second nail head 86. Valve shaft 88 can be compound, formed by a shaft piece 87 that attaches to or is formed integrally with nail head 84 and another shaft piece 89 that attaches to or is formed integrally with nail head 86. Shaft piece 89 is received within shaft piece 87 in FIG. 3, although the arrangement might be reversed. Pump body 46 forms a valve guide 90 receiving valve shaft 88, and a second valve seat 92 that is positioned fluidly between control chamber 56 and valve guide 90. Second nail head 86 blocks second valve seat 92 at the open position of admission valve 58, approximately as shown in FIG. 3. Valve seat 92, when blocked, can assist in limiting leakage up through valve guide 90 and around valve shaft 88. A biasing spring 82 biases admission valve 58 toward the first position. In the illustrated embodiment biasing spring 82 is trapped between second nail head 86 and a portion of pump body 46 such that biasing spring 82 is held in compression axially between first nail head 84 and second nail head 86. Also shown in FIG. 3 is a relatively greater travel distance 78 and a relatively lesser travel distance 80. Admission valve 58 may be movable travel distance 78 from its first position to its second position by way of lifting admission valve 58 from valve seat 54. Control valve 68 may be movable travel distance 80 from its closed position to its open position.

Figure 4:
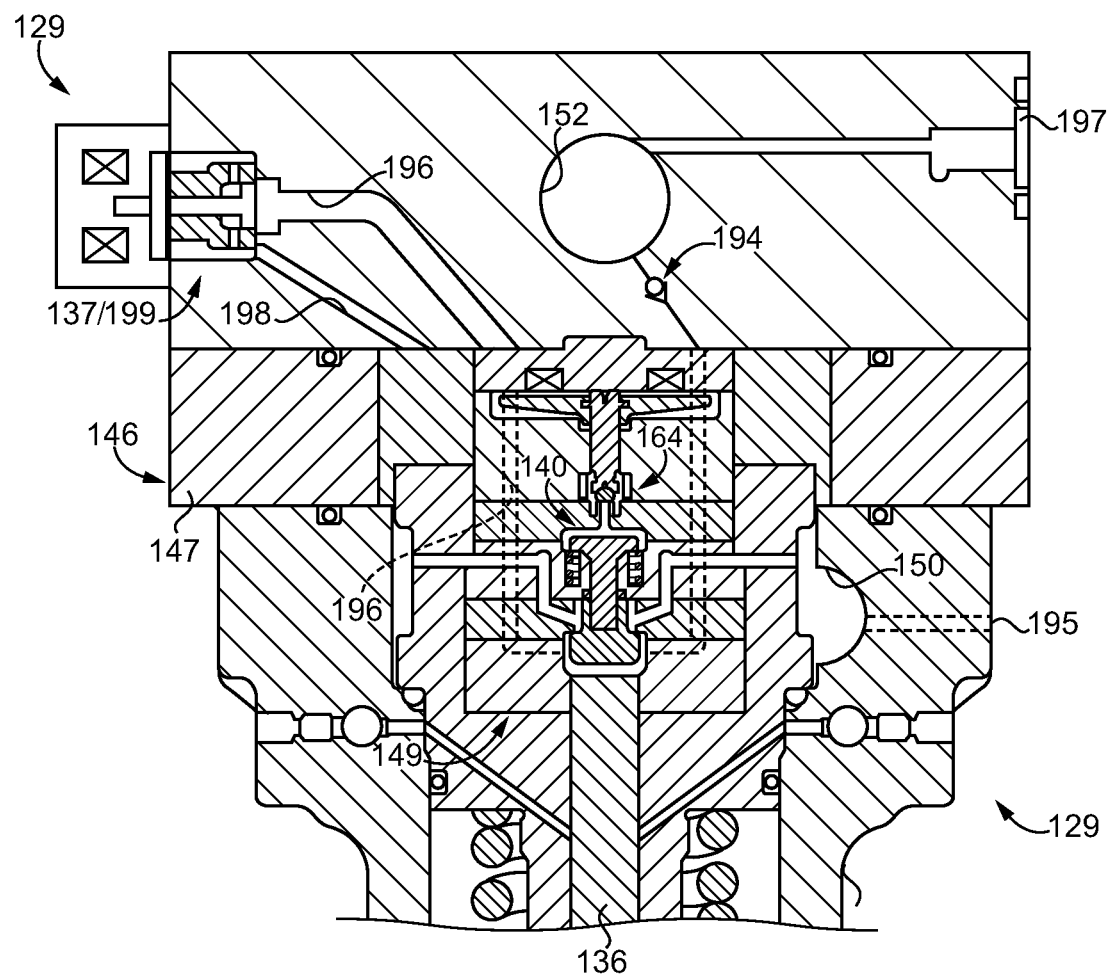
FIG. 4 is a sectioned side diagrammatic view of a pump incorporating the pump valve assembly of FIG. 3.

Referring now to FIG. 4, there is shown a pump 129 having a pump valve assembly 140 positioned therein. Pump 129 is similar to pump 129 in FIG. 2 and is therefore described with the same reference numerals, although it should be appreciated that the FIG. 4 embodiment might not be a common rail pump, might not include multiple plungers, or might not be a fuel pump at all. Pump body 146 may be configured as an outer casing 147 that receives a valve stack 149. A low pressure inlet 195 is shown within outer casing 147, and fluidly communicates with and/or is part of a low pressure space 150. A high pressure outlet 197 is also shown, and could fluidly connect with a common rail or the like. The components shown in FIG. 4, including pumping element 136, could be one of two substantially identical arrangements within a pump housing, or could be only a single pumping element and associated components, as suggested above. In the embodiment shown in FIG. 4, pump 146 can include an outlet metered pump having a check valve 194 positioned fluidly between pump valve assembly 140 and high pressure outlet 197. A spill passage is shown at 196 and is selectively connectible to a return passage 198 by way of a spill valve assembly 140/199.

Figure 5:
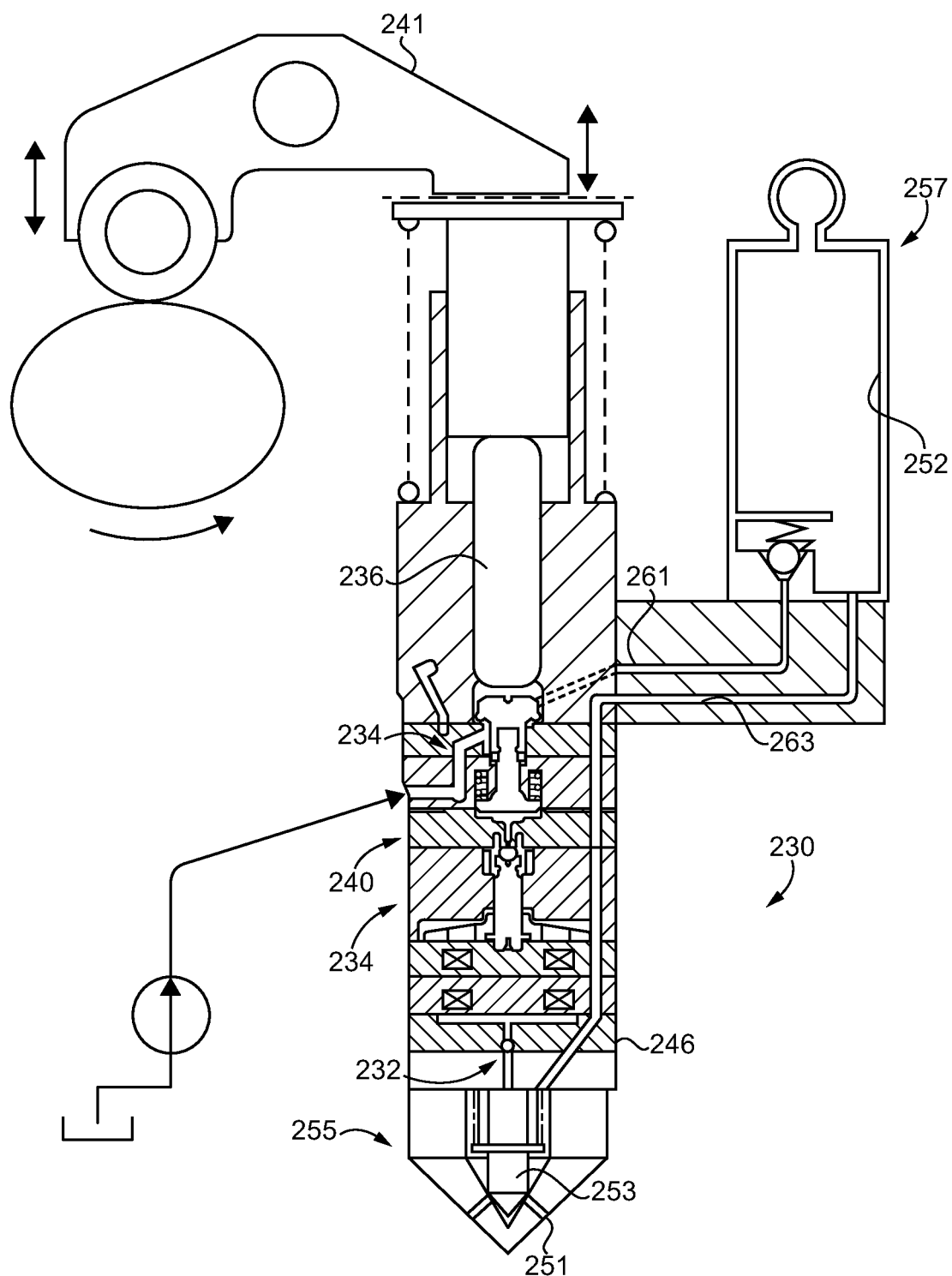
FIG. 5 is a sectioned side diagrammatic view of a fuel injector having a pump and pump valve assembly, according to one embodiment.

Turning now to FIG. 5, there is shown yet another implementation where a pump valve assembly 240 is positioned within a fuel injector 230, having a fuel injector/pump body 246 that includes a nozzle 255 having a plurality of outlet orifices 251 formed therein, and an outlet check 253 movable from a first position where outlet check 253 blocks orifices 251 from fluid communication with a high pressure space 252, to a second position where orifices 251 are in fluid communication with high pressure space 252. Pump valve assembly 240 is shown incorporated in a unit pump 234 that includes a pumping element 236 coupled with a cam 239 by way of a rocker arm 241. Fuel injector 230 is also shown coupled with an accumulator 257 that is part of or in fluid communication with high pressure space 252. An accumulator supply passage 261 extends from a pumping element 236 to accumulator 257, and a nozzle supply passage 263 extends from accumulator 257 to outlet check 253. In one embodiment, accumulator 257 is a dedicated accumulator coupled with a total of one fuel injector 230. In other embodiments, accumulator 257 can include a shared accumulator that stores pressurized fuel for use by multiple fuel injectors. Systems are contemplated where a unit pump is associated with less than all of the fuel injectors in a fuel system. A unit pump might be coupled with every other fuel injector, so that half of the fuel injectors have a unit pump and half of the fuel injectors do not. Other arrangements are possible within the present context. Fuel injector 230 also includes an injection valve assembly 232 to selectively actuate outlet check 253 for injecting fuel at a desired injection timing and in a desired manner.

INDUSTRIAL APPLICABILITY

Referring to the drawings generally, but now described in the context of the embodiment of FIGS. 1 and 3, fluid may be pressurized by way of operating pump 34 by reciprocating pumping element 36 in response to rotation of the associated cam 39. High pressure in control chamber 56 will be applied to opening hydraulic surface 62 so long as control valve 68 is closed. A biasing spring (not shown) could be provided to bias control valve 68 toward its closed position. When pumping element 36 moves toward an advanced position, pressure can build in pumping chamber 48 so long as admission valve 58 remains closed. When pumping element 36 begins to return from its advanced position toward a retracted position, pressure in pumping chamber 48 can drop such that the high pressure prevailing in control chamber 56 can actuate admission valve 58 open. Stated another way, admission valve 58 can move in response to the application of a fluid pressure in control chamber 56 from its closed position blocking valve seat 54 to its open position where valve seat 54 connects pumping chamber 48 with low pressure space 50. Fluid may then be admitted from low pressure space 50 into pumping chamber 48 by way of valve seat 54 during an intake stroke of pumping element 36.

It can be further appreciated that admission valve 58 can be latched at the second position, approximately as shown in FIG. 3, so long as high pressure remains in control chamber 56. When control valve 68 is open to fluidly connect control chamber 56 with low pressure space 50, fluid pressure of control chamber 56 will be reduced and admission valve 58 can be moved back to the first position in response to the reduction of the fluid pressure of control chamber 56. With valve seat 54 thusly blocked, fluid admitted into pumping chamber 48 can be pressurized by way of pumping element 36 in a pressurization stroke.

Those skilled in the art will appreciate the energy requirements for actuating a large number of electrically actuated components in an engine system, such as electrically actuated valves. Those skilled in the art will also appreciate that controlling a valve directly through use of a solenoid and an armature can be energetically expensive, with the further a valve needs to travel being exponentially related to the power required to move that valve. In some instances, moving a valve a great enough distance to provide a robust flow area for incoming fluid in a pump can exceed the power requirements that can be accommodated by a single electronic control module of standard design. For this reason, relatively high travel of admission valve 58, for example 250 microns to 300 microns to achieve sufficient flow area, can be achieved with the pilot actuation provided by pressurized fluid according the present disclosure.

The present description is for illustrative purposes only, and should not be construed to narrow the breadth of the present disclosure in any way, Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A pump comprising:
a pump body defining a pumping chamber, a low pressure space, a high pressure space, a first valve seat positioned fluidly between the pumping chamber and the low pressure space, and a control chamber in fluid communication with the high pressure space;
a pumping element coupled with the pump body and movable within the pumping chamber;
an admission valve having a closing hydraulic surface exposed to a fluid pressure of the pumping chamber, and an opening hydraulic surface exposed to a fluid pressure of the control chamber; and
a control valve assembly including an electrical actuator, and a control valve positioned fluidly between the control chamber and the low pressure space;
the control valve is movable by way of the electrical actuator between a closed position where the control chamber is blocked from the low pressure space such that a pressure of the high pressure space acts on on the opening hydraulic surface, and an open position where the control chamber is fluidly connected to the low pressure space;
the admission valve includes a nail valve having a first nail head with the closing hydraulic surface formed therein, a second nail head with the opening hydraulic surface formed thereon, and a valve shaft extending between the first nail head and the second nail head;
the pump body further forming a valve guide receiving the valve shaft, and a second valve seat positioned fluidly between the control chamber and the valve guide; and
the admission valve is movable between a first position where the first nail head blocks the first valve seat and the second nail head does not block the second valve seat is open, and a second position where the second nail head blocks the second valve seat and the first nail head does not block the first valve seat.

2. The pump of claim 1 wherein the control valve includes a free-floating valve member and a rod extending between the free-floating valve member and an armature of the electrical actuator.

3. The pump of claim 1 wherein:
the admission valve is movable a first distance to the second position at which the first valve seat is open; and
the control valve is movable a second distance from the closed position to the open position, and the second distance is less than the first distance.

4. The pump of claim 3 further comprising a biasing spring biasing the admission valve toward the first position.

5. The pump of claim 1 further comprising a cam coupled with the pumping element.

6. The pump of claim 5 wherein the pump body further has an outlet orifice formed therein, and further comprising an outlet check movable from a first position where the outlet check blocks the outlet orifice from fluid communication with the high pressure space, to a second position where the outlet orifice is in fluid communication with the high pressure space.

7. An electrically actuated pump valve assembly comprising:
a pump body defining a pumping chamber structured to receive a movable pumping element, a low pressure space, a high pressure space, a first valve seat positioned fluidly between the pumping chamber and the low pressure space, and a control chamber in fluid communication with the high pressure space;

an admission valve movable between a first position blocking the first valve seat, and a second position where the first valve seat is open, and the admission valve having a closing hydraulic surface exposed to a fluid pressure of the pumping chamber, and an opening hydraulic surface exposed to a fluid pressure of the control chamber;

a control valve assembly including an electrical actuator, and a control valve positioned fluidly between the control chamber and the low pressure space; and the control valve being movable by way of the electrical actuator between a closed position where the control valve blocks the control chamber from the low pressure space, and an open position where the control chamber is fluidly connected to the low pressure space;

the admission valve includes a nail valve having a first nail head with the closing hydraulic surface formed therein, a second nail head with the opening hydraulic surface formed thereon, and a valve shaft extending between the first nail head and the second nail head;

the pump body further forming a valve guide receiving the valve shaft, and a second valve seat positioned fluidly between the control chamber and the valve guide; and the admission valve is movable between a first position where the first nail head blocks the first valve seat and the second nail head does not block the second valve seat, and a second position where the second nail head blocks the second valve seat and the first nail head does not block the first valve seat.

8. The pump valve assembly of claim 7 further comprising a biasing spring biasing the admission valve toward the first position.

9. The pump valve assembly of claim 8 wherein the biasing spring is held in compression between the first nail head and the second nail head.

10. The pump valve assembly of claim 7 wherein the nail valve is movable a first distance between the first position and the second position, and the control valve is movable a second distance between the closed position and the open position, and the second distance is less than the first distance.

11. The pump valve assembly of claim 10 wherein the control valve includes a free-floating valve member and a rod extending between the free-floating valve member and an armature of the electrical actuator.

12. A pump comprising:

a pump body defining a pumping chamber, a low pressure space, a high pressure space, a valve guide, a first valve seat positioned fluidly between the pumping chamber and the low pressure space, a second valve seat positioned fluidly between the control chamber and the valve guide, and a control chamber in fluid communication with the high pressure space;

a pumping element coupled with the pump body and movable within the pumping chamber;

an electrically actuated control valve assembly including a control valve positioned fluidly between the control chamber and the low pressure space, and movable between a closed position where the control chamber is blocked from the low pressure space, and an open position;

a nail valve having a first head with a closing hydraulic surface exposed to a fluid pressure of the pumping chamber, a second head with an opening hydraulic surface exposed to a fluid pressure of the control chamber, and a valve shaft within the valve guide and extending between the first head and the second head; and the nail valve is movable between a first position where the first head blocks the first valve seat and the second head does not block the second valve seat, and a second position where the second head blocks the second valve seat and the first head does not block the first valve seat.

13. The pump of claim 12 wherein:

the pump body defines a center axis;

the first head includes a first axially outer side having the closing hydraulic surface formed thereon, and a first axially inner side in contact with the first valve seat at the first position of the nail valve; and the second head includes a second axially outer side having the opening hydraulic surface formed thereon, and a second axially inner side in contact with the second valve seat at the second position of the nail valve.

* * * * *